United States Patent Office 3,748,116
Patented July 24, 1973

3,748,116
METHOD FOR PRODUCING METALLIC IRON POWDER FROM IRON ORE CONCENTRATE
George G. Reed, Jr., Oakville, Ontario, Canada, and Janusz M. Karpinski and Sidney V. Fox, Bethlehem, Pa., assignors to Bethlehem Steel Corporation
No Drawing. Filed Aug. 24, 1970, Ser. No. 66,564
Int. Cl. C21b 1/08, 1/28
U.S. Cl. 75—3                                14 Claims

ABSTRACT OF THE DISCLOSURE

A method for producing iron powder containing about 0.60% silica from iron ore concentrate. The iron ore is beneficiated by any one of several commercial processes, such as froth flotation. The iron ore concentrate is mixed with an organic binder, such as lignin, and is balled. The green balls are dried and, then, together with a solid carbonaceous reductant and a desulfurizing agent, are charged into one end of a rotary kiln. The iron ore in the green balls is reduced to metallic iron at a temperature of about 1900° F. to 2200° F. The pellets, excess solid reductant and desulfurizing agent are discharged from the kiln. The metallic pellets are recovered and subjected to impact grinding. The ground material is beneficiated by magnetic separation. The magnetic portion is annealed and reground to a suitable size distribution and the metallic iron is recovered as a usable product.

BACKGROUND OF THE INVENTION

This invention is directed to the manufacture of iron powder by direct reduction of iron ore.

High purity direct reduced iron powder suitable for processing into usable powder metallurgy parts is made by a batch-process. The process requires the use of high purity iron ore concentrates such as those processed from high grade Swedish iron ores. The iron ore concentrates and solid reductant are charged into a furnace in alternate layers. The charged materials are heated to the desired temperature for a time sufficient to reduce substantially all the iron ore to metallic iron. The iron powder discharged from the furnace contains a high percentage of impurities. Since the process is a batch process and the product is relatively fine it is difficult to separate the impurities from the iron. The process is lengthy, complicated and expensive.

It is therefore the object of this invention to provide a process for producing high purity iron powder which is relatively simple and inexpensive.

It is an object of this invention to provide a process for producing high purity iron powder in which iron ore is directly reduced to metallic iron which is recovered by sequential impact grinding-annealing-impact grinding steps.

It is an object of this invention to provide a process for producing high purity iron powder which is substantially continuous.

SUMMARY OF THE INVENTION

Broadly, the invention includes forming green balls containing iron ore concentrate and an organic binder, drying the green balls and charging the dried green balls, a solid reductant and a desulfurizer to a rotary kiln. The charge is heated for a time at a temperature to reduce substantially all the iron oxide to metallic iron. The metallic iron pellets are separated from the waste materials. The separated pellets are impact ground to a desired particle size. The waste materials are separated from the metallic iron liberated by the grinding and are discarded. The cleaned metallic iron particles are annealed and are impact ground a second time to a desired final size. The reground metallic iron particles are then beneficiated and separated from waste material produced in the regrinding step.

PREFERRED EMBODIMENT OF THE INVENTION

We have found that iron powder of a desired purity can be manufactured from iron ore concentrate and/or iron-oxide-bearing particles by mixing the raw materials with an organic binder, balling the mix, drying the green balls and firing the dried green balls, a solid reductant and a desulfurizer at a temperature for a time to reduce substantially all the iron oxide to metallic iron. The metallic iron pellets are separated in a first beneficiating step from waste materials by screening and/or magnetic cobbing. The pellets are ground in a first grinding step to a desired particle size. During grinding metallic iron particles are liberated. Any waste materials which were in the pellets prior to grinding, are removed by magnetic separation. The metallic iron particles are annealed and again ground in a second grinding step to reduce the particles to the final desired size. The ground material may require a third separation to remove waste material from the metallic iron particles liberated in the second grinding step.

Iron ore concentrate or iron oxide-bearing particles containing not more than about 0.60% silica ($SiO_2$) and preferably not more than 0.25% silica ($SiO_2$) are mixed with a low ash organic binder to give needed green and dry strength to the balls. The amount of organic binder may be about 20 pounds to 60 pounds to one ton of concentrate. The organic binder may be lignin. The mix, thus formed, is treated in a commercial apparatus, for example a balling disc or cone, to form green balls having a diameter of about ⅜ inch to about ⅝ inch. The green balls are dried at a temperature, for example 250° F., in a suitable furnace. The green balls and an excess of a solid reductant, for example, coke, coke breeze, bituminous coal or anthracite coal, and a desulfurizer, for example, limestone ($CaCO_3$), lime ($CaO$), dolomite [$CaMg(CO_3)_2$] are charged into a rotary kiln. The amount of solid reductant should be about 30% by weight of the green balls charged. Any amount of solid reductant in excess of about 30% by weight of the green balls charged may be used, however practical considerations dictate that not more than about 50% may be used. The dried green balls are fired to within a temperature range of about 1900° F. to 2200° F. in the rotary kiln for a time sufficient to obtain not less than about 95% metallization of the iron oxide in the pellets. The products of the firing step are discharged from the kiln and are classified a first time, for example, screened to separate the pellets from excess solid reductant and the desulfurizer. The pellets are then subjected to a first grinding in a centrifugal impact grinding mill, to reduce the particles to about −100 U.S. sieve size. The waste material is removed from the liberated metallic iron particles in a second separation step which may be a magnetic separator. The liberated metallic iron particles are annealed within a temperature range of about 1600° F. to about 2000° F. in a suitable furnace, for a time in a hydrogen ($H_2$)-rich atmosphere formed by the dissociation of ammonia, a typical example of which is a 75% $H_2$-25% $N_2$ mixture by volume. The metallic iron particles are then subjected to a second centrifugal impact grinding step to reduce the metallic iron particles to the final desired size. The material from the second impact grinding step may be subjected to a third beneficiation step to remove the waste materials therefrom but this step is not essential.

The use of the centrifugal impact grinding steps, as noted above, more easily liberates the metallic iron values from the waste materials and also prevents overgrinding the pellets to obtain the desired particle size. Then, too, the particles are formed into a more uniform size and shape.

In this specification, it must be understood that wherever percentages are referred to, such percentages are on a weight basis unless otherwise noted.

A green ball is a spherical-like particle formed on a commercial apparatus, i.e. a balling disc, cone or drum, and contains iron oxide, an organic binder and about 8% to 10% water.

A dried green ball is a green ball which has been heated to a temperature sufficiently high to evaporate the water therein. The temperature range is about 212° F. to about 500° F.

A pellet is a dried green ball which has been heated to within a temperature range of about 1800° F. to about 2300° F. for a time sufficient to reduce substantially all the iron oxide therein to metallic iron and to form a hardened spherical-like particle, which particle will resist degradation during handling.

The impact grinding steps to which the pellets are subjected consist of feeding the pellets to a rotating member of a mill having a desired velocity. The pellets are crushed by hurling them against a stationary member of the mill. The metallic iron and gangue materials are separated along the contact plane or line whereat they join to form an entity rather than across said contact plane or line. As a result, the metallic iron is more easily and more completely separated from the gangue materials. It is unnecessary to subject the pellets to a lengthy grinding procedure to obtain the desired separation and size distribution. Overgrinding of the metallic particles thereby is avoided.

In a specific example of the invention, about 90 pounds of an iron ore concentrate containing 71.5% total Fe present mainly as magnetite and .20% silica, were mixed with 2.2 pounds of lignin. The mix was balled in a balling tire to form green balls about ⅝ inch in diameter. The green balls were dried at a temperature of 250° F. About 90 pounds of dried green balls, 50 pounds of —¼" coke breeze and 5 pounds of —10+35 mesh dolomite were charged into one end of a rotary kiln. The charge materials were heated to about 1900° F. for a time to reduce substantially all the iron oxide to metallic iron and to form reduced discrete pellets. The pellets were discharged from the kiln and were screened to separate the pellets from excess solid reductant, ash and lime. The metallic iron pellets were then ground in a centrifugal impact grinding mill. Substantially all the particles passed a 100 mesh U.S. sieve. The metallic iron particles were annealed in a furnace at about 1600° F. for about 4.5 hours in an atmosphere containing 100% dry $H_2$. The metalic iron particles were again ground in a centrifugal impact grinding mill. The particles were reduced to about —100 mesh. Analysis of the iron powder showed it contained:

Chemical analysis

| | |
|---|---|
| C | .02 |
| S | .006 |
| Mn | .03 |
| Ni | .011 |
| V | .049 |
| $SiO_2$ | .20 |
| *Fe$^t$ | 99.6 |

*Fe$^t$ = total iron.

The iron powder had an apparent density of 2.26 grams/cc., a Hall rate of flow of 33.7 seconds.

We claim:

1. A method for producing high purity iron powder consisting substantially of metallic iron and not more than about 0.60% silica from iron-oxide bearing materials, comprising:
   (a) forming a mix of said iron oxide bearing material and an organic binder into green balls,
   (b) drying the green balls,
   (c) charging the dried green balls, a solid carbonaceous reductant and a desulfurizer into a kiln,
   (d) heating the charged materials to a temperature for a time to produce metallized pellets and to reduce not less than 95% of the iron oxide to metallic iron,
   (e) discharging the metallized pellets and excess solid carbonaceous reductant and desulfurizer from the kiln,
   (f) separating the metallized pellets from the solid carbonaceous reductant and desulfurizer discharged from the kiln in step (e),
   (g) grinding the metallized pellets in a first centrifugal impact grinding step to liberate the metallic iron from the gangue and to reduce the particles of the metallic iron in size,
   (h) magnetically separating the liberated reduced particles of the metallic iron from the gangue,
   (i) annealing the particles of reduced metallic iron recovered in step (h), and
   (j) grinding the annealed particles of metallic iron from step (i) in a second centrifugal impact grinding step to reduce the particles of metallic iron to a size suitable for iron powder processes.

2. The method of claim 1 with the further step of subjecting the particles of metallic iron from step (j) to magnetic separation.

3. The method of claim 1 in which the organic binder of step (a) is lignin added in an amount of about 20 pounds to about 60 pounds per ton of oxide-bearing material.

4. The method of claim 1 in which the amount of solid reductant of step (c) is not less than about 30% by weight of the green balls charged therewith.

5. The method of claim 3 in which the solid reductant and desulfurizer of step (c) are anthracite coal and lime, respectively.

6. The method of claim 5 in which the temperature of step (d) is within a range of about 1900° F. to about 2200° F.

7. The method of claim 6 in which the metallic iron is reduced in size to below about 100 mesh U.S. sieve size in step (g).

8. The method of claim 7 in which the annealing temperature of step (i) is within the range of about 1600° F. to about 2000° F. and the atmosphere is rich in $H_2$.

9. The method of claim 8 in which the metallic iron values are reduced to below about 100 mesh sieve size.

10. A method for producing iron powder consisting of metallic iron and not more than about 0.60% silica from iron ore concentrates, comprising:
    (a) forming a mix of iron ore concentrate containing not more than 0.60% silica and about 6 pounds to about 48 pounds of a low ash organic binder per ton of iron ore concentrate into green balls,
    (b) drying the green balls,
    (c) charging the dried green balls, a solid carbonaceous reductant and a desulfurizer into a rotary kiln,
    (d) heating the charged materials to within a temperature range of about 1900° F. to about 2200° F. for a time effective to form metallized pellets and to reduce not less than 95% of the iron to metallic iron,
    (e) discharging the metallized pellets and excess solid carbonaceous reductant and desulfurizer from the kiln,
    (f) separating the metallized pellets from the solid reductant and desulfurizer discharged from the rotary kiln in step (e), (g) separating the metallized pellets from the solid reductant and desulfurizer discharged from the rotary kiln in step (e), (h) impact grinding the metallized pellets in a centrifugal impact grinding step to reduce substantially all the pellets to a particle size of −100 mesh sieve size, (i) magnetically separating the reduced particles of metallic iron from gangue, and (j) annealing the reduced metallic iron particles of step (i) in a hydrogen-enriched atmosphere.

11. The method of claim 1 in which the metallized pellets are separated magnetically from the solid carbonaceous reductant and desulfurizer in step (f).

12. The method of claim 10 in which the metallized pellets are separated magnetically from the solid reductant and desulfurizer in step (f).

13. In an improved method for producing high purity iron powder consisting of metallic iron and not more than 0.60% silica from iron oxide materials which are mixed with an organic binder, balled, dried and treated in a furnace at a temperature for a time in the presence of a solid carbonaceous reductant and a desulfurizer to form metallized pellets wherein not less than 95% of the iron oxide therein is reduced to metallic iron, discharging the metallized pellets, the remainder of the solid carbonaceous reductant and desulfurizer from the furnace and separating the metallized pellets from the remainder of the solid carbonaceous reductant and desulfurizer, the improvement comprising:

(a) centrifugally impact grinding the metallized pellets to liberate the metallic iron from the gangue material in a first grinding step and to reduce the particle size of the metallic iron, (b) magnetically separating the liberated particles of metallic iron from the gangue material, (c) annealing the particles of metallic iron recovered in step (b).

14. The improved method according to claim 13 additionally comprising:

(d) centrifugally impact grinding the annealed particles of metallic iron from step (c) in a second grinding step to reduce the particle size of the metallic iron to −100 mesh sieve size, and (e) collecting the particles of the metallic iron of step (d).

References Cited

UNITED STATES PATENTS

| | | | |
|---|---|---|---|
| 3,414,402 | 12/1968 | Volk | 75—1 |
| 2,855,290 | 5/1957 | Freeman | 75—3 |
| 2,792,298 | 5/1957 | Freeman | 75—3 |
| 2,865,731 | 12/1958 | Crowe | 75—3 |
| 2,771,354 | 11/1956 | Mocklebust | 75—3 |

HYLAND BIZOT, Primary Examiner

P. D. ROSENBERG, Assistant Examiner

U.S. Cl. X.R.

75—4